United States Patent
Feron et al.

(10) Patent No.: US 10,040,023 B2
(45) Date of Patent: Aug. 7, 2018

(54) PROCESS AND APPARATUS FOR HEAT INTEGRATED LIQUID ABSORBENT REGENERATION THROUGH GAS DESORPTION

(71) Applicant: Commonwealth Scientific and Industrial Research Organisation, Australian Capital Territory (AU)

(72) Inventors: Paul Feron, Floraville (AU); Leigh Thomas Wardhaugh, Stockton (AU); Ashleigh Jane Cousins, Brisbane (AU)

(73) Assignee: COMMONWEALTH SCIENTIFIC AND INDUSTRIAL RESEARCH ORGANISATION (AU)

( * ) Notice: Subject to any disclaimer, the term of this patent is extended or adjusted under 35 U.S.C. 154(b) by 494 days.

(21) Appl. No.: 14/443,377

(22) PCT Filed: Nov. 22, 2013

(86) PCT No.: PCT/AU2013/001345
§ 371 (c)(1),
(2) Date: May 16, 2015

(87) PCT Pub. No.: WO2014/078899
PCT Pub. Date: May 30, 2014

(65) Prior Publication Data
US 2015/0283498 A1    Oct. 8, 2015

(30) Foreign Application Priority Data
Nov. 22, 2012  (AU) .................. 2012905124

(51) Int. Cl.
B01D 19/00     (2006.01)
B01D 53/14     (2006.01)
(Continued)

(52) U.S. Cl.
CPC ....... *B01D 53/1425* (2013.01); *B01D 53/268* (2013.01); *B01D 61/362* (2013.01);
(Continued)

(58) Field of Classification Search
None
See application file for complete search history.

(56) References Cited

U.S. PATENT DOCUMENTS 4,444,571 A * 4/1984 Matson .............. B01D 53/1425
                                                    95/258
4,583,996 A * 4/1986 Sakata .................. B01D 53/22
                                                    264/167

(Continued)

*Primary Examiner* — Amber R Orlando
*Assistant Examiner* — Phillip Y Shao
(74) *Attorney, Agent, or Firm* — Francis Law Group (57) ABSTRACT

A process and apparatus for stripping a gas from a gas-rich liquid. The apparatus includes a desorption unit (10) to desorb a gas from the gas-rich liquid to form a first product stream (13) including the gas and a vapor, and a second product stream (14) including a gas-lean liquid. The desorption unit (10) includes a gas-rich liquid inlet (25), a first product stream outlet, and a second product stream outlet. The apparatus further includes at least one of a membrane condenser (22) and/or a membrane (evaporator 17). The membrane condenser (22) includes a membrane interface (26) permeable to the vapor through which vapor transfers from the first product stream to the gas-rich liquid stream and the membrane evaporator (17) includes a membrane interface (18) permeable to the vapor through which vapor transfers to separate a vapor portion from the second product stream (14), and an outlet for a vapor reduced second product stream.

16 Claims, 4 Drawing Sheets

(51) Int. Cl.
  *B01D 53/26* (2006.01)
  *B01D 61/36* (2006.01)
(52) U.S. Cl.
  CPC .... *B01D 53/1456* (2013.01); *B01D 2257/104* (2013.01); *B01D 2257/302* (2013.01); *B01D 2257/304* (2013.01); *B01D 2257/404* (2013.01); *B01D 2257/502* (2013.01); *B01D 2257/504* (2013.01); *B01D 2257/7022* (2013.01); *B01D 2257/7025* (2013.01); *Y02C 20/20* (2013.01)

(56) References Cited

U.S. PATENT DOCUMENTS

| | | | |
|---|---|---|---|
| 4,875,908 A * | 10/1989 | Kikukawa | B01D 53/228 95/52 |
| 5,034,025 A * | 7/1991 | Overmann, III | B01D 53/22 95/52 |
| 5,681,433 A * | 10/1997 | Friesen | B01D 53/22 159/DIG. 27 |
| 5,749,941 A * | 5/1998 | Jansen | B01D 53/1468 95/44 |
| 6,197,269 B1 * | 3/2001 | Jansen | B01D 53/229 210/679 |
| 7,066,396 B2 * | 6/2006 | Knight | F22D 1/36 237/16 |
| 7,964,020 B2 * | 6/2011 | Baker | B01D 53/22 60/274 |
| 2006/0135811 A1 * | 6/2006 | Seiki | B01D 3/14 562/410 |
| 2007/0214957 A1 * | 9/2007 | Feron | B01D 19/0031 95/46 |
| 2009/0057128 A1 * | 3/2009 | Vane | B01D 1/28 203/17 |
| 2011/0127218 A1 * | 6/2011 | Reddy | B01D 19/0015 210/640 |
| 2012/0125196 A1 * | 5/2012 | Woodhouse | B01D 53/1425 95/193 |
| 2015/0044100 A1 * | 2/2015 | Yukumoto | G01N 27/06 422/114 |

* cited by examiner

PROCESS AND APPARATUS FOR HEAT INTEGRATED LIQUID ABSORBENT REGENERATION THROUGH GAS DESORPTION

FIELD OF THE INVENTION

This invention relates to a method and apparatus for improving the energy efficiency of gas stripping and regeneration of sorbents and in particular to the stripping of $CO_2$ from liquid absorbents.

BACKGROUND OF THE INVENTION

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

Figure 1:
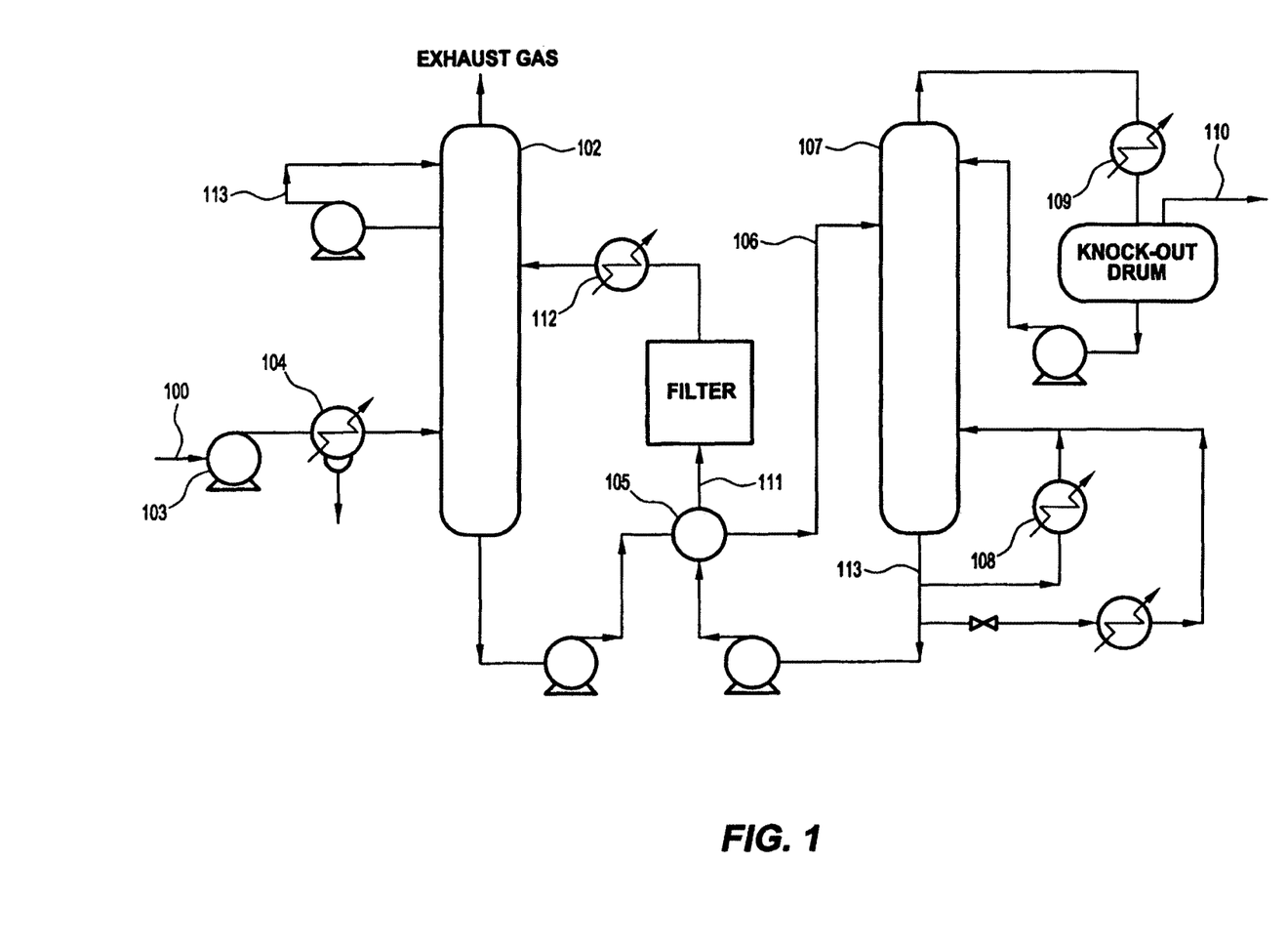
FIG. 1 is flow sheet of $CO_2$ recovery using chemical absorbents according to the prior art.

The separation of $CO_2$ from flue gases in power stations, cement kilns and in steel manufacturing allows these industrial activities to proceed with the use of fossil fuels, while reducing the emissions of the most important greenhouse gas, i.e. $CO_2$. Although several different processes are currently under development for the separation of $CO_2$ from flue gases, chemical absorption processes using aqueous solutions of chemical absorbents are the leading technology, mainly because of its advanced state of development. While it is already available at low $CO_2$-removal capacities, it is not at the scale necessary for large scale industrial operation. Scaling up the process is therefore a major challenge. The typical flow sheet of $CO_2$ recovery using chemical absorbents is shown in FIG. 1.

After cooling, the flue gas 100 is brought into contact with the chemical absorbent in an absorber 102. A blower 103 is required to pump the gas through the absorber after passing through a cooler 104 at temperatures typically between 40 and 60° C. whereby $CO_2$ is then bound by the chemical absorbent in the absorber 102. After passing through the absorber 102, the flue gas undergoes a water wash section 113 to balance water in the system and to remove any droplets of vapour carried over and then leaves the absorber 102. The "rich" absorbent solution, which contains the chemically bound $CO_2$, is then pumped to the top of a stripper 107, via a heat exchanger 105. The regeneration of the chemical absorbent is carried out in the stripper 107 at elevated temperatures (100-140° C.) and pressures between 1 and 2 bar. The stripper 107 is a gas/liquid contactor in which the rich absorbent is contacted with steam produced in a reboiler 108.

Heat is supplied to the reboiler 108 to maintain the regeneration conditions. This leads to an energy penalty as a result of the heating up the solution to provide the required desorption heat for desorbing the chemically bound $CO_2$ and for steam production which acts as a stripping gas. Steam is recovered in a condenser 109 and fed back to the stripper 107, whereas the $CO_2$ product gas 110 leaves the condenser 109. The heat of condensation is carried away in cooling water or an air cooling device. The $CO_2$-product 110 is a relatively pure (>99%) product, with water vapour being the main other component. Due to the selective nature of the chemical absorption process, the concentration of inert gases is low. The "lean" absorbent solution 111, containing far less $CO_2$ is then pumped back to the absorber 102 via the lean-rich heat exchanger 105 and a cooler 112 to bring it down to the absorber temperature level. $CO_2$ removal is typically around 90%.

The energy requirement of a chemical absorption process mainly stems from the heat supplied to the reboiler 108. This heat is used to produce steam from the lean solution 106 which acts a stripping gas, i.e. it keeps the partial pressure of $CO_2$ sufficiently low to provide a driving force for the desorption process. The steam is also the carrier of thermal energy which, through its condensation, releases the energy required to desorb $CO_2$ and to heat up the chemical absorbent through the desorption column 107. The amount of steam generated in the reboiler 108 should be kept as a low as possible, but some of the steam will always inevitably be lost from the desorption unit with the $CO_2$-produced and this represents an energy loss, as the steam is usually condensed and the energy is carried away in the cooling water.

There exists a need to provide a process and apparatus that is more energy efficient than the present process. Various approaches have been suggested in the prior art.

WO 2007/075466 discloses an approach in which the lean chemical absorbent exiting from the bottom of the desorption column, is sent to a flash vessel at lower pressure than the equilibrium pressure. The lean solution has a low $CO_2$ partial pressure; hence the vapour produced is predominantly steam. The steam can be recompressed and injected into the desorber to provide additional steam for stripping and heating of the chemical absorbent in the desorption column. This requires the addition of two pieces of equipment: flash vessel and a compressor. This adds to capital and operating expenses. Furthermore, the addition of a further compressor adds to the overall energy consumption—thus detracting from energy savings, which is undesired.

U.S. Pat. No. 4,152,217 discloses the recovery and reuse of heat by using a heat exchanger to extract heat energy from the $CO_2$/steam mixture exiting the desorption column through heat exchange with the rich absorbent solution entering the desorption column. This allows the latent heat of condensation to be recovered as sensible heat in the rich absorbent. The teachings of this patent show however that a split of the rich absorbent flow into two streams is needed, which is complicated from a process flow and control perspective.

U.S. Pat. No. 4,444,571 discloses a method to recover latent heat from gas/steam mixtures that uses a membrane which is selectively permeable towards steam over other gases contained in the mixture. Permeate which predominantly contains steam is recompressed and injected into the bottom section of the desorption column. Although suitable membranes are available, the process requires additional energy, which is undesirable.

The state-of-the-art methods to improve the energy performance of the desorption column are all limited because they only address a single improvement step and assume the usual process lay-out as shown in FIG. 1.

It is an object of the invention to address at least some of the above aforementioned short-comings of the prior art.

SUMMARY OF THE INVENTION

In the context of the invention, the usually practiced term of "rich" liquid absorbent (i.e. gas-rich) refers to the liquid absorbent which contains an amount of absorbed gases higher than the minimum concentration. These absorbed gases are progressively removed during the regeneration process. At the point at which no more gases are being desorbed from the liquid absorbent, i.e. the minimum concentration of absorbed gases, the liquid absorbent is called "lean" (i.e. gas-lean). At this point, the liquid absorbent might still contain a sizeable amount of absorbed gases. Thus in the present application a liquid absorbent containing an amount of absorbed gases higher than the lean absorbent concentration is referred to as a rich liquid absorbent.

According to one aspect of the invention, there is provided a method of stripping a gas from a gas-rich liquid including:

heating a gas-rich liquid in a desorption unit to desorb the gas from the gas-rich liquid, and form a first product stream including the gas and a vapour, and a second product stream including a gas-lean liquid; and at least one step of:
  contacting the first product stream with a vapour permeable membrane condenser to remove at least a portion of the vapour from the first product stream through the permeable membrane interface, the first product stream passing through the membrane condenser and exchanging heat with at least a portion of the gas rich liquid entering the desorption unit to heat the gas-rich liquid stream; and/or
  contacting the second product stream with a vapour permeable membrane evaporator to remove at least a portion of the vapour from the second product stream through a membrane interface of the permeable membrane and returning the separated portion from the second product stream to the desorption unit.

In one embodiment, the step of contacting the first product stream with a gas-rich liquid stream, includes condensing vapour in the first product stream into liquid to form part of the gas-rich liquid stream. The contacting and condensing step is preferably conducted in the membrane condenser. The first product stream and the gas rich liquid may be introduced into the membrane condenser in counter current or co-current flow although counter current is the preferred option. In this embodiment, vapour is condensed as it passes through the membrane interface into the gas-rich liquid inlet stream.

In a further embodiment which may be incorporated with aspects of other embodiments of the invention, the step of removing at least a portion of the vapour from the second product stream includes:
  flash vaporising at least a portion of second product stream through the membrane interface of the membrane evaporator.

Subsequent to the flash vaporisation, the second product stream (with flashed vapour removed) is provided to a heat exchanger to heat at least a further portion of the gas-rich liquid stream to the desorption unit.

Preferably the step of heating the gas-rich liquid in the desorption unit includes heat exchange or contact with steam.

The gas may be a non-condensable gas. The invention is preferably suited to gases selected from the group consisting of $CO_2$, $H_2S$, or $SO_2$ and the gas-rich liquid and the gas-lean liquid include a gas absorbent selected from the group consisting of: ammonia, alkanol-amines, alkyl-amines, amino-acids, salts thereof, inorganic bases and mixtures thereof.

In regard to the membrane condenser and evaporator steps, the membrane is preferably a steam permeable membrane and more preferably a steam selective membrane. The vapour permeable membrane of at least one of the membrane condenser and membrane evaporator is hydrophobic or hydrophilic. When the membrane interface of the membrane condenser is hydrophobic and separates a gas rich liquid from a gaseous first product stream, the pressure in the gas rich liquid is greater than the pressure in the gaseous product stream. Additionally when the membrane interface of the membrane evaporator is hydrophobic and separates a gaseous second product steam from a liquid regenerator return stream, the pressure in the liquid return stream is preferably greater than the pressure in the gaseous second product stream.

In operation preferably, the temperature of the desorption unit is from about 80° C. to about 200° C. and the pressure in the desorption unit is from about 0.5 bar to about 15 bar.

In another aspect of the invention, there is provided an apparatus for stripping a gas from a gas-rich liquid including:

a desorption unit to desorb a gas from the gas-rich liquid to form a first product stream including the gas and a vapour, and a second product stream including a gas-lean liquid, the desorption unit including a gas-rich liquid inlet, a first product stream outlet, and a second product stream outlet; and at least one of
  a membrane condenser including
    inlets to receive the first product stream and gas-rich liquid stream
    a membrane interface permeable to the vapour through which vapour transfers from the first product stream to the gas-rich liquid stream,
    an outlet in fluid communication with the gas-rich liquid inlet of the desorption unit, and an outlet for a vapour reduced first product stream; and
  a membrane evaporator including
    an inlet to receive at least a portion of the second product stream, a membrane interface permeable to the vapour through which vapour transfers to separate a vapour portion from the second product stream, and an outlet for a vapour reduced second product stream.

Preferably the apparatus includes both the membrane condenser and membrane evaporator and further preferably includes a, heating unit to provide heat to the desorption unit. The first product stream and the gas rich liquid stream may be received into the membrane condenser in counter current or co-current flow although counter current is the preferred option The desorption unit preferably operates in conjunction with an absorption unit for contacting lean liquid absorbent gas stream to produce the gas rich liquid stream and a heat exchange arrangement for transferring heat between the vapour reduced second product stream and a portion of the gas rich stream from the absorption unit. At least a portion of the vapour reduced second product stream is in fluid communication with the absorption unit. The gas rich stream from the heat exchange arrangement is in direct or indirect fluid communication with the desorption unit.

It is preferred that the permeable membrane of the membrane condenser and/or membrane evaporator is substantially impermeable to gas at the operating temperature and pressure of the respective condenser or evaporator. The membrane may be a selective membrane and preferably the membrane of the membrane interface for the membrane condenser and/or evaporator is made from a hydrophobic material. Alternatively the membrane of the membrane interface for the membrane condenser and/or evaporator is made from a hydrophilic material but different operating pressures in the condenser and evaporator are required Advantageously, the invention provides considerable reductions in the thermal energy requirement for liquid absorbent regeneration in amine based post-combustion capture (PCC) processes. As such it addresses one of the main disadvantages of prior art PCC without having to revert to alternative liquid absorbents.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

The present invention is applicable to the regeneration of liquid absorbents, containing gases which have been absorbed from a mixture of feed gases at a lower temperature than the regeneration temperature, at which these gases are removed from the liquid absorbent. Gases to be removed are typically so-called acid gases like carbon dioxide and hydrogen sulphide, but the process is applicable to any gas-liquid absorbent combination, where the gas absorption is thermally reversible. The liquid absorbent will typically contain a component easily vaporised, such as water or methanol and one or more components which lead to an increase in the gas absorption capacity of the liquid absorbent. These types of components are dependent on the gases to be removed. For acid gas removal these components are typically organic bases such amines including ammonia, mono-ethanolamine and other alkanolamines and inorganic bases such as carbonate and phosphate.

Thus in one embodiment, the present invention is directed towards a process and apparatus for heat integrated liquid absorbent regeneration through gas desorption. The regeneration apparatus may include an inlet for the gas-rich liquid absorbent, i.e. a liquid absorbent which contains a certain amount of the absorbed gaseous component(s) to be removed, an outlet for gas-lean liquid absorbent, i.e. a liquid absorbent which contains a reduced amount of the absorbed gaseous component(s) to be removed, an outlet for the gaseous component(s) and vapour(s) desorbed from the liquid absorbent, a system of conduits, heat exchangers, contact equipment effectuating predominantly counter-current operation for the rich liquid absorbent with both the lean liquid absorbent and the gaseous component to be removed although not necessarily in each of the zones described below. The apparatus may further include;

a vapour production zone where vapour, typically steam, required to provide the thermal energy necessary for the desorption of gases and for the maintenance of the driving force for gas desorption, is generated through boiling of the liquid absorbent, preferably a reboiler, one or more gas desorption and condensation zones, in which vapour condenses into the liquid absorbent in a gas-liquid contactor, thereby providing the energy required for the desorption of gases from the liquid absorbent, one or more heat transfer zones in which sensible heat is transferred from a lean liquid absorbent to a rich liquid absorbent, and/or steam produced from the lean liquid absorbent is condensed thereby transferring the latent heat to the rich absorbent. This is preferably a heat exchange arrangement.

The apparatus includes at least one of—one or more vapour transfer zones in which vapour is transferred from the lean liquid absorbent (second product stream) to the rich liquid absorbent (gas rich liquid) via a membrane which significantly prohibits the transfer of either liquid absorbent and desorbed gases, one or more vapour condensation zones in which vapour is transferred from the mixture of desorbed gases and vapours (first product stream) to the rich liquid absorbent (gas rich stream) via a membrane which significantly prohibits the transfer of either liquid absorbent and desorbed gases in either direction, and one or more heat transfer zones, in which heat is transferred from the lean liquid absorbent (second product stream) to a cooling medium via evaporation or conduction.

An advantage of the above embodiment is that it does not require compressors for gas or vapour phases and instead uses only liquid pumps as rotating equipment.

An example of an apparatus for heat integrated liquid absorbent regeneration according to the embodiment described above is shown in the flow sheet shown in FIG. 2. It involves the recovery of latent heat by condensation and evaporation through vapour permeable and liquid tight membranes.

Figure 2:
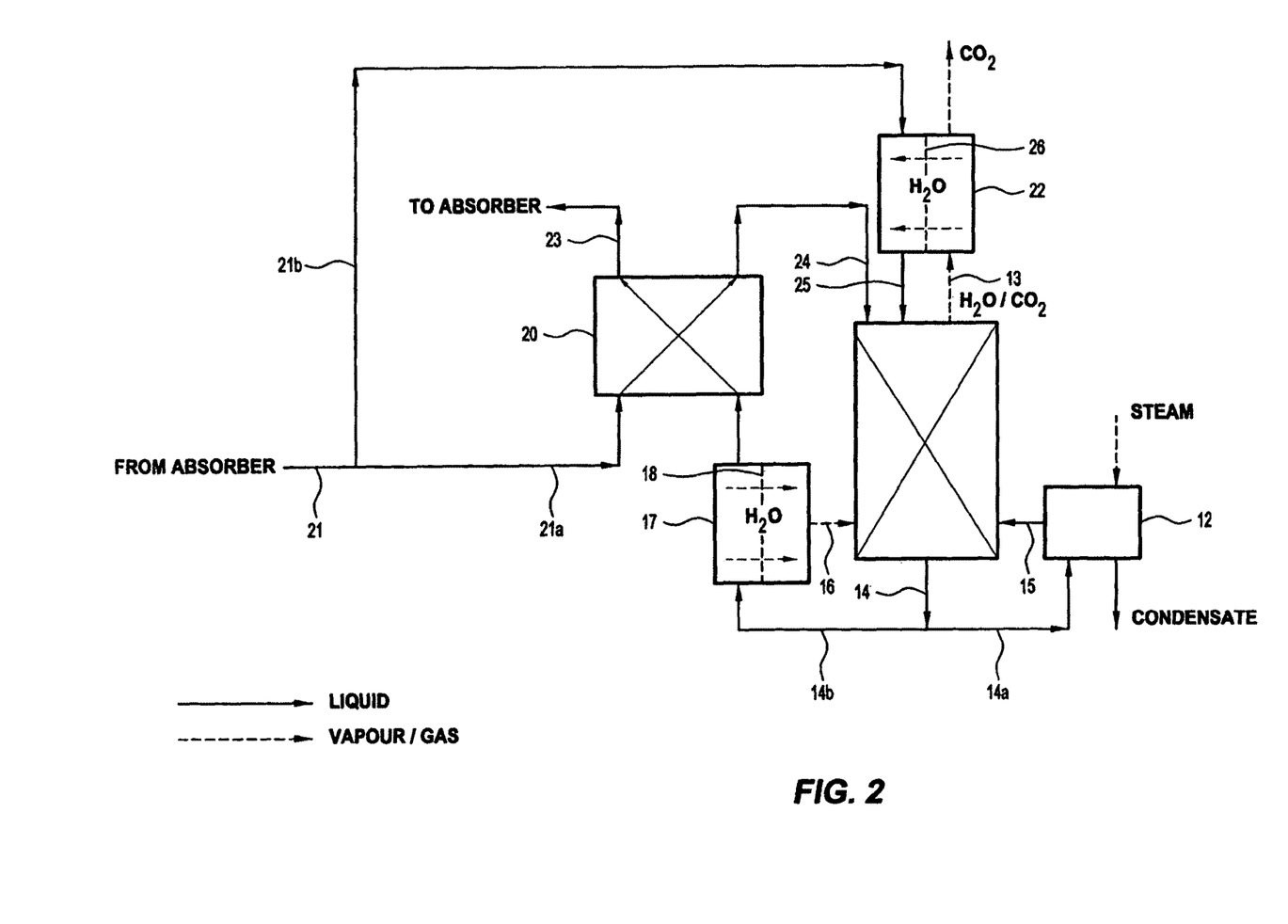
FIG. 2 is an illustration of an embodiment of the invention showing a gas desorption unit, for desorption of a gas from a gas-rich liquid absorbent that includes heat transfer apparatus for recovery heat energy.

FIG. 2 provides an illustration of an embodiment of the invention. FIG. 2 shows a gas desorption unit, for desorption of a gas from a gas-rich liquid absorbent that includes heat transfer apparatus for recovery heat energy.

The apparatus of FIG. 2 includes a regeneration column (or gas desorption unit or stripper). A gas-rich liquid absorbent is introduced into the regeneration column through a first inlet 25 and/or a second inlet 24. In the regeneration column 10 and associated reboiler 12, the gas-rich liquid absorbent is contacted with a heated vapour (such as steam). This causes the gas (such as $CO_2$) to become desorbed from the gas-rich liquid, providing a first product stream 13 that includes the gas and vapour and a second product stream 14 that includes a gas-lean liquid. The vapour is introduced into the regeneration column from a first vapour inlet 15 and/or a second vapour inlet 16. The first vapour inlet is connected to a reboiler unit 12 which uses heat energy to convert a liquid to vapour. The second vapour inlet 16 is connected to a membrane evaporator 17.

The gas-lean liquid 14 exits the vessel 10, and a portion of the gas-lean liquid 14a is passed to the reboiler, where it is provided with heat energy and converted to a vapour. This vapour is then reintroduced into the regeneration column 10 through the first vapour inlet 15. Another portion of the gas-lean liquid 14b is passed to the membrane evaporator 17. As this portion 14b passes through the membrane evaporator 17, a difference in partial pressure of the vapour exists across the membrane. This difference in partial pressure causes transfer or flash vaporisation of a portion 14b of the gas-lean liquid to form a flash-vapour. The flash-vapour (steam) passes through a membrane wall 18 of the membrane evaporator 17 and is reintroduced into the regeneration column 10 via the second vapour inlet 16. The unevaporated portion 19 of the gas-lean liquid is then passed through a heat exchanger 20, in which heat is transferred to a portion 21$a$ of gas rich stream 21 from a gas absorber (not shown) which passes to the second inlet 24 to the regeneration column 10. After passing through the heat exchanger 20, the gas-lean liquid 23 is then passed to an absorber (not shown) to be recharged with gas.

The first product stream 13, which includes the gas that has been desorbed from the gas-rich liquid, and a vapour (such as steam) is extracted from the regeneration column 10 and passed to a membrane condenser 22. The membrane condenser 22 includes a membrane interface 24 that is permeable to the vapour. On one side of the membrane interface 24 is a gas-rich liquid absorbent from a portion 21$b$ of the stream from the absorber, and on the other side of the membrane interface 24 is the first product stream 13. As the first product stream 13 passes through the membrane condenser 22, the vapour passes across the membrane 24 and into the gas-rich liquid absorbent from stream 21$b$. Some or substantially all of the vapour can be removed from the first product stream 13 in this manner. This results in a high purity product 25 that includes primarily the desorbed gas. As stated, the vapour passes through the membrane 24 and into the gas-rich liquid absorbent from stream 21$b$. The vapour is condensed into a liquid, thus liberating heat energy which heats the gas-rich liquid prior to entry into the regeneration column 10. The heated gas-rich liquid is then introduced into the desorption column through the first inlet 24.

The embodiment shown in FIG. 2 encompasses two primary locations for transfer and recovery of latent heat.
(i) energy is recovered from the lean hot liquid absorbent 14, 14$a$, 14$b$ exiting from the bottom of the regeneration column 10. There is usually a considerable difference between the temperature of the rich absorbent entering the desorption unit 10 and the lean absorbent leaving the regeneration column, because the temperature difference is determined by the vapour-liquid equilibrium at a given pressure. Flash vapours from the lean solvents can be directly fed back into the regeneration column as a way of obtaining better heat recovery. In this concept, no vapour compression is needed and steam is simply evaporated through a vapour permeable membrane 18 into the regeneration column. The membrane is ideally placed into the regeneration column to provide a short flow path, avoiding the need for recompression. As the evaporation process has very high transfer rates the re-absorption of $CO_2$ into the lean liquid absorbent will be limited. Furthermore the presence of the membrane 18 and its porous structure can help in limiting re-absorption of $CO_2$ into the lean solvent as it acts as an additional diffusional barrier.
(ii) energy is recovered by exchanging heat between the $CO_2/H_2O$ gas-stream 13 exiting the regenerator 10 and part of the incoming rich absorbent 21$b$, as shown in FIG. 2. Normally the water vapour in the stream is simply condensed and the energy carried away in a cooling water stream. In the concept of the invention heat recovery is achieved through condensation of water vapour through a vapour permeable membrane 26. Here also the presence of the membrane barrier 26 can help in limiting re-absorption of $CO_2$ into the rich solvent.

The advantage of using a membrane for the transfer of water vapour (either through evaporation or condensation) stems from the direct contact between the vapours and the liquid through the membrane barriers.

Both heat recovery methods involve the recovery of sensible and latent heat into the overall process consisting of a regenerator column 10, condenser 22 and lean/rich heat exchanger 20. It involves the transfer of water vapour, either through evaporation and condensation ultimately resulting in the transfer of latent heat from one phase to the other. This can be done in a more efficient, controlled and selective manner using a water permeable membrane. There is a wide range of polymer and inorganic membranes available, porous and non-porous, which could do this efficiently.

Figure 3:
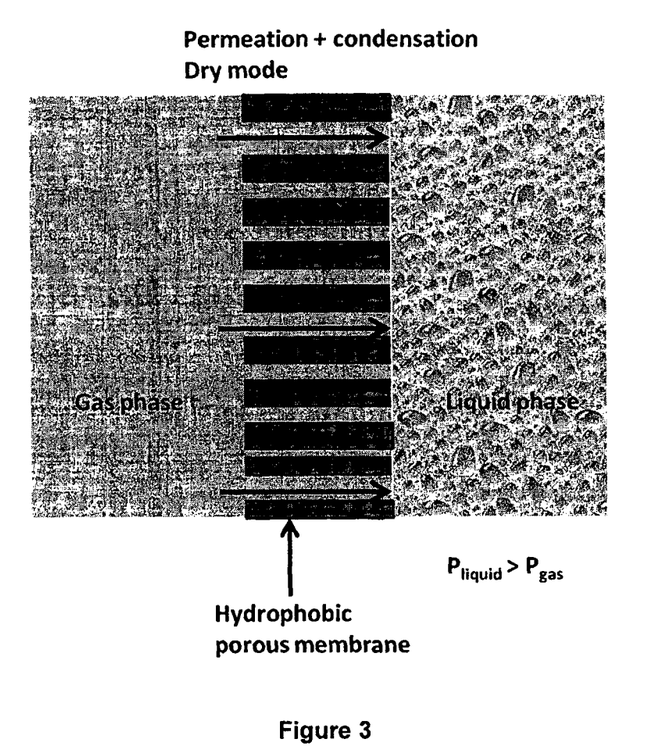
FIG. 3 is a schematic diagram of the operation of a hydrophobic porous membrane for transfer of water vapour (condensation mode)
Figure 4:
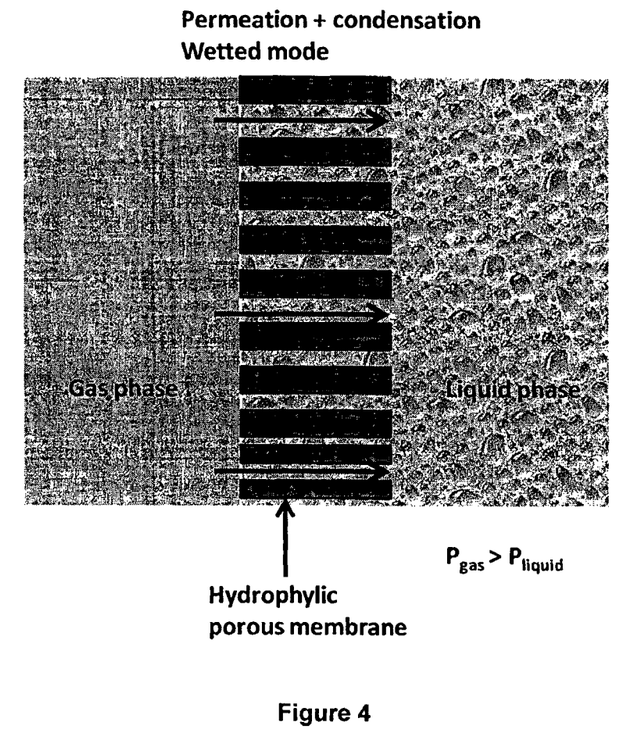
FIG. 4 is a schematic diagram of the operation of a hydrophilic porous membrane for transfer of water vapour (condensation mode).

The two membrane concepts are illustrated in FIGS. 3 and 4 for the condensation mode. For the evaporation mode the transfer of water vapour is just reversed.

In FIG. 3, the water vapour (in the $CO_2/H_2O$ stream 13) is contacted via the hydrophobic porous membrane with the colder rich liquid absorbent stream (ie. 21$b$ in FIG. 2). The pressure on the liquid absorbent side should be higher than on the gas side, otherwise the gas will simply permeate through the pores and bubble through the liquid. This is to be avoided as the intensive mixing of gas and liquid might result in $CO_2$ transfer to the absorption liquid which is not desired. The condensation of the water vapour in the rich liquid absorbent enables the recovery of latent heat. For porous membranes, the absorption liquids are not allowed to enter the membranes pores until the break-through pressure is exceeded. This is influenced by pore size, pressure difference across the membrane and the interaction of absorption liquid with the membrane material. These surface phenomena are described by the Laplace equation:

$$\Delta p = -2(\gamma/r) \cdot \cos \Theta \tag{1}$$

in which

| | | |
|---|---|---|
| $\Delta p = P_{liquid} - P_{gas}$ | Pressure differential | [N/m$^2$] |
| $\gamma$ | Surface tension of liquid | [N/m] |
| r | Pore radius | [m] |
| $\Theta$ | Contact angle | |

The membrane pores will not be wetted if the contact-angle is greater than 90° and the pressure differential is limited for a given pore size.

Suitable membrane materials for aqueous absorption liquids are non-polar polymers, such as, polypropylene, polyethylene and polytetrafluoroethylene. As surface tension decreases with temperature break-through pressures decrease with increase in temperature. Membranes will have a pore size distribution which means that some wetting is likely to occur. Once the membrane pores are wetted some absorption liquid will permeate through the membrane to the gas side. However a small amount of liquid permeation, although not desired, is not regarded as critical because the transfer of water vapour and the recovery of heat will not be affected by this. The liquid will simply end up in the regeneration column and it will not be lost.

In FIG. 4 the second configuration is shown. In this mode the membranes are hydrophilic and through the capillary forces the membrane pores are wetted. When the liquid side pressure is only slightly higher than the gas side pressure the liquid will permeate through the membrane quite easily. By imposing a higher pressure on the gas side compared to the liquid side the liquid permeation can be reduced. As the membranes are wetted the bubble point, i.e. the point at which gas will start to permeate through the membrane can be determined by:

$$\Delta p = 2(\gamma/r) \tag{2}$$

in which:

| | | |
|---|---|---|
| $\Delta p = P_{gas} - P_{liquid}$ | Pressure differential | [N/m$^2$] |
| $\gamma$ | Surface tension of liquid | [N/m] |
| r | Pore radius | [m] |

If the pressure difference is in excess of the value given by equation 2 the gas will bubble through the membrane into the liquid. This is undesirable. If the liquid side pressure is slightly higher than the gas side pressure, liquid would be expected to permeate quite easily through the membrane.

Suitable membrane materials for aqueous absorption liquids are hydrophilic polymers, such as, polysulphone, polyethersulphone, polyvinylalcohol and polyamides and ceramic materials or metals; membrane materials which are generally used for liquid filtration purposes such microfiltration, ultrafiltration, nano-filtration and reverse osmosis. Also in this membrane configuration a small amount of liquid absorbent permeation or leakage, although not desired, is not regarded to be critical as the transfer of water vapour and the recovery of heat will not be affected by this. The liquid will simply end up in the regeneration column and it will not be lost. Such liquid permeation is likely to occur through pin-holes, imperfections and areas where the pore sizes are much larger than the nominal poresize. Therefore liquid permeation rates of up to 10% of the full stream are considered to be acceptable, although not desired.

In both the condensing and evaporating mode of the process, it is beneficial to limit the transfer of $CO_2$ back into the liquid absorbent as there will be a driving force towards re-absorption. The condensing or evaporation process is much faster than the process of $CO_2$-absorption into the liquid and will result in favourable conditions to limit $CO_2$ re-absorption. However, the membrane should exhibit a high steam permeability to avoid lowering the vapour transfer rates, whether it is the condensing or evaporating part. The steam permeability should therefore be higher than $3 \cdot 10^{-7}$ mol/m$^2$ sPa (~1000 GPU), preferably higher than $3 \cdot 10^{-6}$ mol/m$^2$ sPa (~10,000 GPU) and ideally higher than $3 \cdot 10^{-5}$ mol/m$^2$ sPa (~100,000 GPU).

The invention has generally been described for use in removal of carbon dioxide from a gas-rich absorbent. The gas rich-absorbent may be aqueous alkaline solutions (inorganic salts, amines including amino-acid salts). The gas rich-absorbent may be regenerated at typical regeneration temperatures i.e. between 100° C. and 150° C. The source of $CO_2$ might be from natural gas streams, flue gases, biogas, shale gas, coal seam gas, industrial gases, air, etc.

Although the invention has been broadly described with reference to removal of $CO_2$ from a gas-rich absorbent, it will be appreciated by those skilled in the art that the apparatus and method of the invention is applicable to removal of other gases from a gas-rich absorbent. For example, the method and apparatus may be used for removal of $H_2S$, $SO_2$, or generally other acid gases which have been absorbed from a gas stream into an aqueous liquid absorbent. Additionally the method and apparatus may be used in other separations such as paraffin/olefin separations using aqueous silver nitrate solutions, carbon monoxide using ammoniacal cupric chloride solutions, volatile compounds from wastewater where a steam is used to volatalise/desorb a gas from a liquid stream. The stripping vapour might also contain other condensable components with vapour pressures similar to water. Examples range from ammonia and methanol which are fully miscible with water to less-miscible components based on hydrocarbons such as toluene, depending on the type of liquid absorbent.

EXAMPLES

The liquid absorbent used in this analysis is an aqueous 30% MEA solution, which is used as the benchmark in many studies. In the standard liquid regeneration process thermal energy is provided via the reboiler, resulting in a bottom temperature of 120° C. This will result in the generation of stripping steam which will travel up the regenerator column. Part of the steam will condense in the liquid absorbent, thereby providing the heat needed to release the $CO_2$ from the liquid absorbent travelling down through the regenerator column. The stripping steam will carry the $CO_2$ up through the column. The $CO_2$ product will leave the column saturated with water at the top temperature of the regenerator column, typically at a ratio of 0.6 tonne steam per tonne of $CO_2$. The steam is removed in the condenser and the heat of condensation is carried away in the cooling water. This constitutes one part of the thermal energy requirement for the liquid regeneration process. A second contribution may come from the requirement to heat up the liquid absorbent from the top of the regenerator column to the bottom of the regenerator column. The isobar operation of the regeneration column and the usual liquid absorbent loading will generally determine this and typically the liquid absorbent needs to be heated by 15 K as it travels down through the column. The final contribution comes from the energy required to break the bond between $CO_2$ and the liquid absorbent and actually desorb $CO_2$ from the liquid absorbent. This is dependent on the liquid absorbent and for MEA and is typically 1.7 GJ/tonne $CO_2$.

The physical properties of the liquid absorbent and a summary of the regeneration process conditions are given in table 1.

TABLE 1

Physical parameters and regeneration process conditions

| Physical property or process condition | Value |
|---|---|
| $CO_2$ binding energy [GJ/tonne $CO_2$] | 1.7 |
| Heat of evaporation [GJ/tonne $H_2O$] | 2.2 |
| Volumetric heat capacity of liquid absorbent [MJ/m$^3$K] | 4 |
| Specific liquid absorbent flow rate [m$^3$/tonne $CO_2$] | 20 |
| Inlet temperature lean/rich heat exchanger - rich absorbent [° C.] | 55 |
| Bottom temperature regenerator column [° C.] | 120 |
| Top temperature regenerator column [° C.] | 105 |
| Pressure regenerator column [bar] | 1.8 |
| $H_2O$—$CO_2$ ratio top regenerator column [tonne $H_2O$/tonne $CO_2$] | 0.6 |

It is anticipated that the thermal energy requirement for regeneration of the liquid absorbent can be reduced significantly by the introduction of one or both membrane applications for any liquid absorbent. This is achieved by:

Recovery of water vapour and latent heat into the rich absorbent resulting in a $H_2O$—$CO_2$ ratio equal to 0.1 after the membrane condenser on top of the regeneration column Transfer of water vapour from the lean absorbent exiting the bottom into the regeneration column resulting in recovery from latent heat into the regeneration column.

Both latent heat recovery methods combined are anticipated to reduce the temperature lift for the liquid absorbent from 15 K to 5 K Through parallel developments further improvements are anticipated in the characteristics of the liquid absorbent leading to a lower binding energy for $CO_2$ and a higher achievable $CO_2$ loading. Both effects are beneficial for the energy requirement for liquid absorbent regeneration.

Table 1 provides a comparison of temperatures and vapour composition in the standard process, the heat integrated process and the heat integrated process using an improved liquid absorbent based on the physical properties and process conditions parameters given in table 1.

TABLE 2

Comparison between standard process and heat integrated process

| Parameter | Standard process | Heat integrated process | Heat integrated process with improved liquid absorbent |
|---|---|---|---|
| $H_2O:CO_2$ ratio top regeneration column [tonne $H_2O$/tonne $CO_2$] | 0.6 | 0.1 | 0.1 |
| Specific liquid absorbent flow rate [m$^3$/tonne $CO_2$] | 20 | 20 | 10 |
| Temperature lift in regeneration column [K] | 15 | 5 | 5 |
| Contribution $CO_2$ desorption [GJ/tonne $CO_2$] | 1.7 | 1.7 | 1.4 |
| Contribution steam evaporation [GJ/tonne $CO_2$] | 1.3 (=0.6 × 2.2) | 0.2 (=0.1 × 2.2) | 0.2 (=0.1 × 2.2) |
| Contribution temperature lift regeneration column [GJ/tonne $CO_2$) | 1.2 (=0.004 × 20 × 15) | 0.4 (=0.004 × 20 × 5) | 0.2 (=0.004 × 10 × 5) |
| Overall specific thermal energy requirement [GJ/tonne $CO_2$] | 4.2 | 2.3 | 1.8 |

The results from the analysis as presented in table 2 indicate that improvements in the thermal energy requirement of 50% are achievable with an absolute value for the thermal energy requirement of 2 GJ/tonne $CO_2$ within reach.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A method of stripping a gas from a gas-rich liquid, comprising the steps of:
   introducing a gas-rich liquid into a desorption unit, said gas-rich liquid comprising a first liquid and a first absorbed content of a gas;
   heating said gas-rich liquid in said desorption unit to desorb said gas from said gas-rich liquid and form first and second product streams, said first product stream including said gas and a first liquid vapor, said second product stream including a gas-lean liquid comprised of a second liquid and a second absorbed content of absorbed gas, said second absorbed gas content of said gas-lean liquid being less than said first absorbed gas content of said gas-rich liquid;
   introducing said first product stream into a vapor permeable membrane condenser that includes a first vapor permeable membrane having a first permeable membrane interface, wherein at least a portion of said first liquid vapor is removed from said first product stream through said first permeable membrane interface and forms a third product stream, and wherein said first product stream exchanges heat with at least a portion of said gas-rich liquid prior to said gas-rich liquid being introduced into said desorption unit, and wherein said third product stream is condensed and introduced into said gas-rich liquid to form a portion of said gas-rich liquid fed into said desorption unit; and
   introducing said second product stream into a vapor permeable membrane evaporator that includes a second vapor permeable membrane having a second permeable membrane interface, wherein at least a portion of said gas-lean liquid forms a second liquid vapor, and at least a portion of said second liquid vapor is removed through said second permeable membrane interface and forms a fourth product stream comprising a third liquid vapor, and wherein said fourth product stream is directed to and introduced into said desorption unit.

2. The method of claim 1, wherein said step of heating said gas-rich liquid comprises heating said gas-rich liquid in said desorption unit to a temperature in the range of 80°-200° C.

3. The method of claim 1, wherein said step of introducing said gas-rich liquid in said desorption unit and condensing said third product stream is conducted in said vapor permeable membrane condenser, and wherein liquid vapor is condensed as it passes through said first permeable membrane interface into said gas-rich liquid.

4. The method of claim 1, wherein said step of removing at least a portion of said second liquid vapor in said second product stream comprises flash vaporizing at least a portion of said second product stream through said first permeable membrane interface.

5. The method of claim 1, wherein said gas is selected from the group consisting of CO2, $H_2S$, CO, $C_2H_4$, $C_3H_6$, $C_4H_8$, $O_2$, $NO_2$, and $SO_2$.

6. The method of claim 4, further including the step of introducing said second product stream into a heat exchanger to heat at least a further portion of said gas-rich liquid prior to introduction into said desorption unit.

7. The method of claim 1, wherein said step of heating said gas-rich liquid includes heat exchange with steam.

8. The method of claim 7, wherein said first vapor permeable membrane and said second vapor permeable membrane comprise a steam permeable membrane.

9. The method of claim 1, wherein pressure in said desorption unit is in the range of 0.5 bar to 15 bar.

10. The method of claim 1, wherein said gas-rich liquid and said gas-lean liquid includes a gas absorbent selected from the group consisting of ammonia, alkanol-amines, alkyl-amines, amino-acids, salts thereof, and mixtures thereof.

11. The method of claim 1, wherein at least one of said first and second vapor permeable membranes comprises a hydrophobic material.

12. The method of claim 1, wherein at least one of said first and second vapor permeable membranes comprises a hydrophilic material.

13. The method of claim 11, wherein said first permeable membrane interface comprises a hydrophobic material and separates said first product stream into said second liquid comprising a further gas rich liquid and first gaseous product stream.

14. The method of claim 13, wherein said first gaseous product stream comprises a first pressure and said second liquid comprises a second pressure, and wherein said second pressure in said second liquid is greater than said first pressure in said first gaseous product stream.

15. The method of claim 11, wherein said second permeable membrane interface comprises a hydrophobic material and separates said second product stream into a third liquid and a second gaseous product stream.

16. The method of claim 15, wherein said second gaseous product stream comprises a third pressure and said third liquid comprises a fourth pressure, and wherein said fourth pressure in said third liquid is greater than said third pressure in said second gaseous product stream.

* * * * *